United States Patent [19]

Strom

[11] 4,077,033

[45] Feb. 28, 1978

[54] PLASMA DISPLAY DRIVE CIRCUIT AND METHOD

[75] Inventor: Richard Albert Strom, Eagan, Minn.

[73] Assignee: Control Data Corporation, Minneapolis, Minn.

[21] Appl. No.: 722,948

[22] Filed: Sep. 13, 1976

[51] Int. Cl.[2] .................. G06F 3/14

[52] U.S. Cl. .................. 340/324 M; 315/169 TV; 363/116

[58] Field of Search ............ 340/324 M, 343, 173 /R, 340/173 PL; 315/169 R, 169 TV

[56] References Cited

U.S. PATENT DOCUMENTS

| | | | |
|---|---|---|---|
| 3,450,967 | 6/1969 | Tolutis | 340/173 R |
| 3,689,912 | 9/1972 | Dick | 340/324 M |
| 3,701,119 | 10/1972 | Waaben et al. | 340/173 R |
| 3,786,474 | 1/1974 | Miller | 340/324 M |
| 3,851,212 | 11/1974 | Umeda et al. | 315/169 TV |
| 3,906,451 | 9/1975 | Strom | 340/324 M |
| 3,939,454 | 2/1976 | Andoh et al. | 340/324 M |
| 3,969,718 | 7/1976 | Strom | 340/324 M |

*Primary Examiner*—Marshall M. Curtis
*Attorney, Agent, or Firm*—William J. McGinnis

[57] ABSTRACT

The present invention consists of improved drive circuitry for a plasma display panel using low voltage switching devices to control charge storage diodes which in turn regulate high voltage currents. These circuits are implemented as clamp bus selection means coupled with high voltage selection pulse circuit means. Further improvements comprise means for grounding unselected clamp buses. In combination with a plasma display panel, other, prior art, drive circuits, the clamp bus selection means and the high voltage selection pulse circuit means, the invention includes special sustain drive circuits.

13 Claims, 6 Drawing Figures

PLASMA DISPLAY DRIVE CIRCUIT AND METHOD

BACKGROUND OF THE INVENTION

This invention relates to drive circuitry for plasma display panels. In particular, this invention consists of circuitry particularly suited for implementing non-coincident techniques for writing and erasing in a panel. Non-coincident drive systems use methods of applying drive pulses on the respective orthogonal drive lines in a display in which the drive pulses for a particular display element are not pulsed at the same time for any particular operation. This invention shows novel drive circuitry using charge storage diodes for implementing the particular drive methods shown. The circuitry is also used to implement the dual-on-state (DOS) method of operation in the display panel.

Of particular pertinence in the prior art in U.S. Pat. No. 3,906,451 issued to the present inventor and assigned to the same assignee. This patent relates to a method and apparatus for non-coincident erase selection in a plasma display panel.

Another patent of particular pertinence in the prior art is U.S. Pat. No. 3,786,474 which relates to a non-coincident method for writing in a plasma display panel.

Two other patents which are of particular pertinence to this application are U.S. Pat. Nos. 3,689,912 and 3,851,212 both of which relate to plasma panel drive circuits and in which charge storage diodes are used to implement some of the features of the disclosure.

Another patent in the prior art is U.S. Pat. No. 3,969,718, issued to the present inventor and assigned to the same assignee, which discloses the operation and function of the dual-on-state in a plasma display panel.

While the above referenced patents will give the reader an insight to the plasma display panel art and work which is related to the present invention, it will be helpful here to discuss in greater detail the theory on which the present invention is developed. Large area plasma display panels, built on the high frequency inherent capacity, memory system of operation, presents challenging problems in the area of design of high performance selection circuitry. Display panels having 1024 by 1024 electrodes and active display areas on the order of about one meter square present large capacitive loads to the drive circuitry. One important design consideration is that drive circuitry for plasma display panels have a low internal impedance so that short rise time pulses may be applied to the panel electrodes. Short rise time pulses are desirable because the best margin in write and erase selection operations may be obtained using such pulses. One common selection method uses a resistor-diode matrix to select display electrodes using a reduced number of driver switching elements. This resistive decoupling method gives speed and power problems when the electrode capacitance exceeds 100 pf. Another selection method uses individual low impedance drivers on each display electrode. This method solves the circuit problem but presents some serious economic problems in producing large display panels.

The use of charge storage diodes (hereinafter CSD) in a selection matrix provides some important advantages in a plasma display selection method. Using CSD elements provides selectable low impedance switches for each of the display electrodes. A CSD is a high voltage diode which has a relatively long reverse recovery time. A low voltage driver/clamp selection matrix selectively forward biases a CSD prior to the application of the desired write or erase pulse. Because of the long reverse recovery time, the selected CSD provides a low impedance path to drive the display electrode. Unselected CSD elements block the selection pulse by the normal high reverse impedance of the diode.

A timing method for applying selection pulses to a plasma display seems to be well adapted to the CSD circuit implementation. This approach called non-coincident selection, is a method in which a full amplitude write or erase pulse is applied on one axis, only, of the orthogonal display electrodes. The pulse is made selective or non-selective by appropriate preconditioning or postconditioning of the display elements. In contrast, the more common selection method presently used requires that coincident positive and negative half-select pulses be applied to opposing display electrodes in the orthogonal array.

It is desired in a large scale plasma display panel to have several characteristics which may be provided by use of the invention described in this application. It is desirable to have as high speed as possible for each of the write and erase functions as well as other operations so that the plasma display panel can have the display changed or updated as rapidly as possible. Of course, with larger and larger numbers of individual display elements shorter functional time per display element becomes more important for each particular operation. It is desirable to have low voltage drive circuitry because low voltage drive and selection elements are considerably less expensive than comparable elements which will operate at high voltage. For example low voltage transistors, operating at approximately 15 volts, may be used in circuitry employing CSDs. These transistors are considerably less expensive than any appropriate high voltage transistors. Another factor is that the entire drive circuitry be built from as few possible number of individual circuit types as possible. The present invention shows a system which has a minimum number of individual circuit types from which the entire system is developed. Also, in large panels it is more and more difficult to achieve reliable writing of display elements and the present invention allows implementation of the dual-on-state method of writing in a display panel. And finally, the present invention has the advantage of providing low impedance drive characteristics for the drive circuitry to allow fast rise time pulses.

SUMMARY OF THE INVENTION

The present invention shows a matrix arrangement of drive circuitry which may be identical for the X and Y drive axes of a plasma display panel. This circuitry is implemented using low voltage switching elements for the selection and application of operational pulses in a non-coincident mode. The low voltage switching is accomplished using charge storage diodes as the operational elements through which the high voltage is coupled to the display panel. The charge storage diodes are also used to decouple drive lines in the display panel adjacent to the line on which an operation is occurring so that the adjacent lines are not affected by the selection pulses that implement operations. The CSD's provide low impedance coupling devices between the high voltage drive circuit and the selected drive element.

Non-coincident pulse driving schemes are used with this drive circuitry so that the drive circuitry may be identical for the orthogonal X and Y axes of the display panel.

Operational functions are shown for the display panel which include the standard write and erase capabilities plus a non-destructive cursor which allows the operator or alternatively the system to provide a location index without altering the written or non-written condition of display elements. Also, a bulk erase operation is shown. Finally, the sustain function is shown which will maintain written cells in the lighted condition.

The dual-on-state operation is a functional part of the display panel drive electrode timing method shown in this application. The dual-on-state is shown in U.S. Pat. No. 3,969,718. The dual-on-state is used for priming inactive display elements in the write cycle and it also provides a method of implementing the non-destructive cursor. The non-coincident drive pulse timing method allows a convenient implementation of the dual-on-state operation in the circuitry shown with this application.

All of the pulses that are applied to the display electrodes for both the X axis and the Y axis are of the same polarity relative to ground. Thus, the drive pulse timing method of the present invention can be accomplished with virtually identical circuitry on both axes of the display panel.

This invention also allows use of less expensive low voltage drive transistors having comparatively slow operating times because the timing features of the non-coincident drive pulses allow overlap in such a way that the narrow pulse widths may be achieved.

As previously stated, the present plasma display panel provides low impedance drive voltage coupling through CSD's to the drive circuitry. This is a function of clamp selection circuits using low voltage transistors and CSDs to suppress partial selection on unselected display electrodes. Further, the clamp circuitry of the present invention is shown in a submatrix configuration to further reduce the number of circuits required for selection. IN THE FIGURES FIG. 1 shows the basic drive pulse timing for operational functions in a non-coincident selection method according to the prior art and the preferred method of operating the circuits comprising this invention, FIG. 2 shows drive pulse timing for alternative embodiments of non-coincident write and erase functions according to the prior art and the preferred method of operating the circuits comprising this invention, FIG. 3 shows the prior art development of charge storage diode selection matrix circuitry, FIG. 4 shows charge storage diode selection circuitry for a single axis of a plasma display panel according to the present invention, FIG. 5 shows the improved clamp bus selection circuitry of the present invention, and FIG. 6 shows an illustrative embodiment of a four by four clamp circuitry submatrix according to the present invention.

DESCRIPTION OF THE PREFERRED EMBODIMENT

Figure 1:
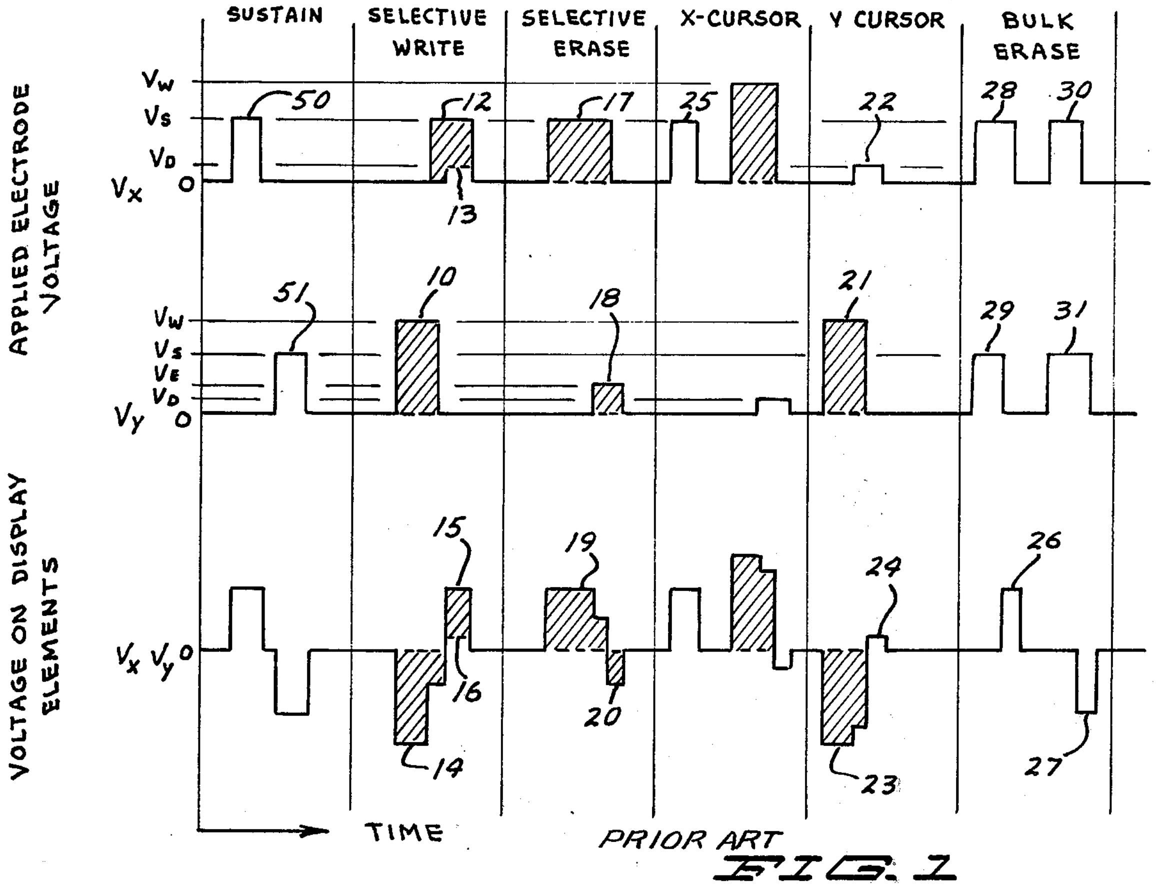
PRIOR ART FIG. 1

FIG. 1 shows the voltage wave shapes for non-coincident drive pulses for a basic set of functions that are useful in operating a plasma display panel system. The dashed lines indicate the voltage level on unselected display electrodes or elements. The shaded area in drive pulses indicates the portion of the pulse which appears on only the selected electrodes or elements. The rise and fall times of the pulses are sufficient so that the voltage transition is completed before the discharge of the display element has extinguished. Typical rise and fall times for pulses are 200 volts in from 0.2 to 0.4 microseconds. The pulse widths for sustain and write type pulses must be adequate to complete the ion collection process on display element dielectrics. This is true in the type of panel consisting of opposed drive elements across a gas medium sometimes called display cells in the prior art, or in the planar type of plasma panel in which the display occurs on a single flat surface associated with respective display elements. (A planar plasma display is shown in U.S. Pat. No. 3,860,846.) These sustain and write pulse widths are typically greater than 1.5 microsecond. The erase type pulse width as found in the erase function, the bulk erase function and the dual-on-state erase function are normally in the range of 0.5 to 1.5 microseconds.

The amplitude of the pulses, in FIG. 1, are indicated as Vd, Ve, Vs, Vw. The definition and typical values for these voltages are as follows:

Vd dual-on-state erase amplitude — 80 volts.

Ve selective erase amplitude — 150 volts.

Vs sustain amplitude — 210 volts.

Vw write amplitude — 350 volts.

Referring now to FIG. 1, the sustain function is achieved by the well-known means of applying a full amplitude sustain pulse first to the X axis electrodes and then, subsequently, to the Y axis electrodes. Both applied pulses have an amplitude of +Vs relative to ground. The resultant voltage applied across the display elements is Vx-Vy. This wave shape is also shown in FIG. 1. This is the familiar bipolar sustain pulse which must be applied repetitively to an alternating current plasma display panel to maintain activated display elements in their written or lighted state and will have no effect on inactive elements. All of the remaining functions serve to activate or extinguish display elements and except for the bulk erase function, the drive pulses are applied selectively to the array of electrodes. A complete cycle of operation involving one of these functions must also include at least one bipolar sustain pulse. That is, normally, all special functions will be preceded or followed by a bipolar sustain pulse. This is required to both preset the memory or display element capacitive voltage to the correct polarity for lighted elements and to maintain the unselected elements in their original lighted or unlighted condition.

Referring again to FIG. 1, the selective write function allows selected elements on the display to be activated so that they will continue to discharge and emit light when subsequent sustain pulses are applied. The write function consists of a selectively applied full amplitude (Vw) write pulse 10 applied to a Y axis electrode, followed by either a selective sustain amplitude pulse 12 (Vs) or a dual-on-state erase pulse 13 applied to the X axis electrodes. The resultant voltage across the display elements (Vx - Vy) is write pulse 14 which will initiate a discharge in any unwritten element along the selected Y axis electrode. Lighted elements along the Y axis electrode will be unaffected by pulse 14 because they have been charged by the preceding sustain pulse which has the same polarity as the write pulse 14. A selective sustain pulse 15 will cause a second discharge in the elements selected to be written and will leave them with memory so that the subsequent sustain pulses will keep them lit. All of the unselected display elements will receive the dual-on-state erase pulse 16. They will also have a second discharge, but the resultant memory or capacitive display element voltage will be 0 and the display elements will be unlighted and therefore discharges will not occur when sustain pulses are applied. It should be noted that the dual-on-state priming techniques which are described in greater detail in U.S. Pat. No. 3,969,718 are an inherent feature in this method of writing.

Again referring to FIG. 1, the selective erase function allows elements to be selectively extinguished so that they will not emit light when subsequent sustain pulses are applied. The erase function consists of first applying a sustain amplitude (Vs) pulse 17 to a selected X axis electrode. This is followed by a full erase amplitude (Ve) pulse 18 that is applied to the selected Y axis electrode. The two pulses are overlapped in time and an erase function as applied across the display element results in pulses 19 and 20. Overlapping pulses 17 and 18 by a predetermined time period allows convenient control on the width of pulse 20 which is important for good erase operation reliability and margin. Selective erasing is accomplished because pulse 19 causes a discharge and inverts the display element capacitive voltage display elements capacitive polarity on only the elements on the selected X axis electrodes. Of these preselected elements, only the selected elements receiving erase pulse 20 will be discharged such that the display element capacitive voltage is reduced to 0 and will thus be erased.

The X cursor and Y cursor function, shown in FIG. 1, allows the formation of an addressable marker or cursor on the display panel for the purpose of indexing position. This may be done by operator control in order to point to a given portion of the panel, or by the display panel system in connection with showing the position of the write or erase operation. If a Y cursor cycle is repeated continuously, a horizontal line of elements will apppear lit over the entire length of the selected Y axis electrode. The X cursor cycle will cause a full length vertical line of lighted elements on the selected X axis electrode. Both the X and Y cursor functions are basic dual-on-state pulses which may be applied and removed without altering elements that are normally lighted. Together the X cursor and Y cursor function perform a versatile non-destructive cursor function which can be used simultaneously for identifying a single display element on the panel which is defined at the intersection of the X and Y cursor lines. Of course, the non-destruction feature of the cursor function refers to the characteristic that the lighted or unlighted condition of the display elements is not changed by use of the cursor. In addition to the visible marker provided by the cursor function, the light output of the cursor display may be detected by a light sensing pen which is gated on or made active only at times the cursor is applied. The cursor function is applied selectively at times that do not coincide with light pulses emitted by the normal sustain operation so that a light pen may detect only the cursor pulses if properly controlled. The Y cursor function consists of a write pulse 21 applied selectively to a Y axis electrode. This is followed by a dual-on-state erase pulse 22 applied to all the X axis electrodes. The combined pulses 23 and 24 form a basic dual-on-state pulse. Note that the elimination of the selective sustain pulse 15 in the write function produces the Y cursor function. This means no additional hardware will be required to create the Y cursor function.

The X cursor function is similar to the Y cursor function except that the axes are interchanged. It is necessary to precondition the entire display with a sustain pulse 25 applied to all of the X axis electrodes. This inverts the display element capactive voltage of the lighted elements so that they will not be disturbed by the X cursor function.

The bulk erase function, shown in FIG. 1, will extinguish every lighted element on the display with a single unselected operation. The function is accomplished by applying one or more very narrow width sustain amplitude pulses to the display elements. A narrow sustain pulse will start a discharge in a lighted element, but the charge collection time is adjusted by the pulse width so that zero capacitive element voltage will be left following the application of one or more of the pulses. Bulk erase pulses 26 and 27 can be created by overlapping the timing for sustain pulses applied to the X and Y axis electrodes. The leading edges of sustain pulse 28 and 29 are applied at the same time. Pulse 29 is returned to 0 ahead of pulse 28. This timing difference generates the narrow pulse 26 which is applied across the display elements. Pulse 27 is created when the X axis sustain pulse 30 is terminated prior to the Y axis pulse 31.

Figure 2:
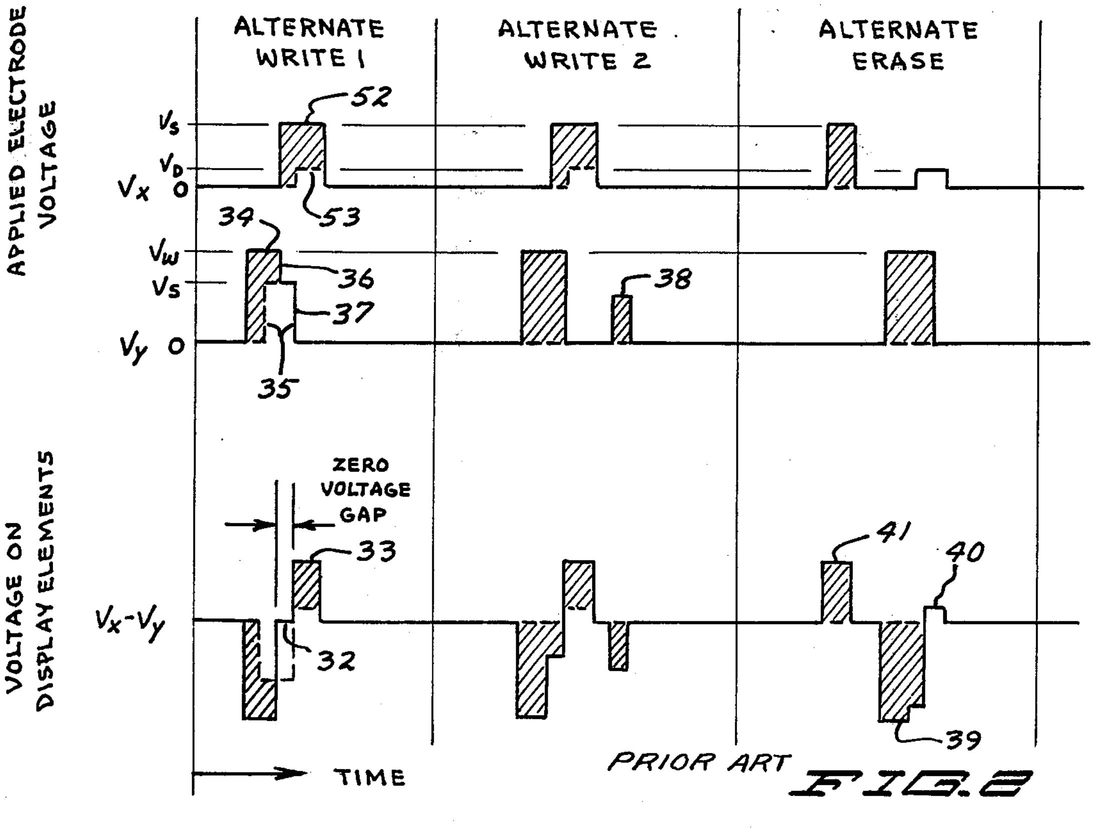
PRIOR ART FIG. 2

Referring now to FIG. 2, alternate write cycle 1 can be shown as an improved version of the selective write function shown in FIG. 1. The basic difference between the two write functions is the 0 voltage gap 32 that is created in alternate write cycle 1. This gap improves operating margin. Without this gap, the selective sustain pulse 15 causes a discharge in the selected elements which produces a capacitive element voltage that is higher than would normally be produced during a sustain operation. This capacitive element voltage will return to normal or come into equilibrium with the normal sustain capacitive element voltage if several sustain discharges occur before another write or erase function is applied. If capacitive element voltage equilibrium is not achieved, there will be a loss of operating margin (where margin is the range over which the pulse amplitude may be changed without a loss or gain of lighted elements on the display).

The purpose of the 0 voltage gap 32 is to allow a discharge to occur at 0 volts prior to the selective sustain pulse 33. The gap width is adjusted so that the total capacitive display element voltage created by both the 0 voltage gap and the selective sustain pulse will be equal to a normal sustain capacitive display element voltage. This will allow the write function to be repeated at a maximum rate without loss of operating margin. The 0 voltage gap width is nominally in the range of 0.5–2 microseconds.

The 0 voltage gap is created by a modification to the Y axis write pulses 34 and 35. Following the application of selected write pulse 34, a sustain pulse 35 is applied to all of the unselective Y axis electrodes. The selected write pulse is pulled down at time 36 to a sustain voltage amplitude prior to the time of complete termination of the pulse at 37.

Referring to FIG. 2, alternate write cycle 2 is similar to the basic selective write shown in FIG. 1 except for the addition of pulse 38. As in alternate write cycle 1 shown in FIG. 2, the purpose of pulse 38 is to restore capacitive display element voltage equilibrium. Both amplitude and pulse width can be adjusted for this purpose. Pulse 38 could be a selected sustain amplitude pulse that has a pulse width less than 1.5 microseconds. Alternate write cycle 2 is less preferred over alternate write cycle 1 because it potentially requires a longer cycle time and may require more hardware elements in the circuitry. However, alternate write cycle 2 does have an advantage of requiring less drive power and may offer a greater degree of control for improving operating margins.

Again referring to FIG. 2, the alternate selective erase function can be achieved by the use of the basic dual-on-state pulse. If a dual-on-state pulse 39, 40 is preceded by a selective sustain pulse 41, display elements that are selectively discharged will be erased by the dual-on-state pulse 39, 40. This form of an erase function is more complex than selective erase pulse 19, 20 but it has the advantage that it does not require a separate erase pulse amplitude Ve. It can be implemented using the same pulse drive as required in the selective write, except that the timing is different.

Figure 3:
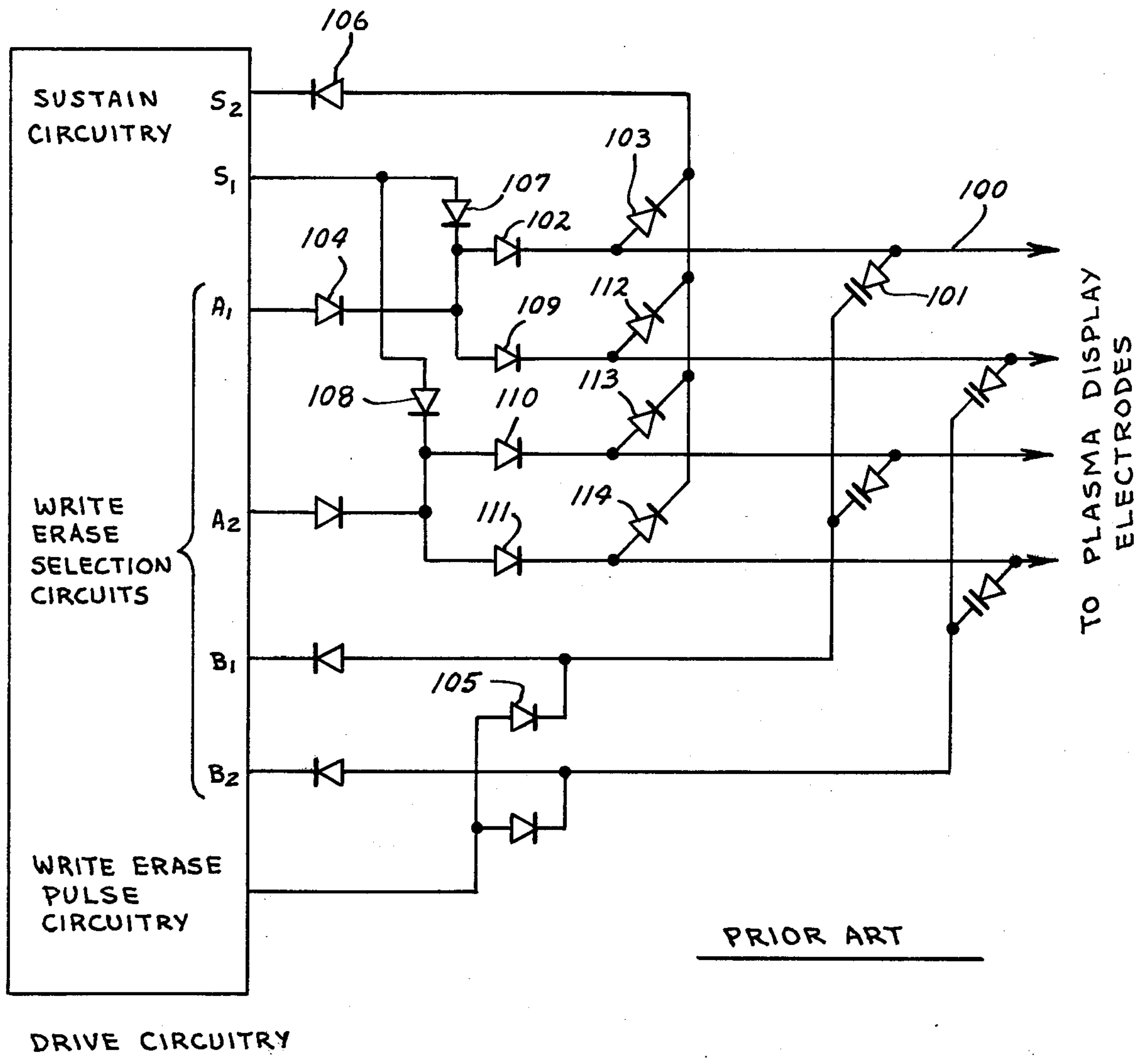

Referring now to FIG. 3, showing prior art according to U.S. Pat. No. 3,689,212, a basic schematic circuit diagram of a charge storage diode selection matrix for a single axis of a 4 × 4 display panel is shown which may be used for applying selection and sustain pulses according to the type herein described in a plasma display panel. Each electrode on the plasma display panel has 3 diodes connected to it, one of which is a charge storage diode (CSD). The CSD and one of the fast recovery diodes are connected in a well-known matrix interconnection method. For example, display electrode 100 has CSD 101 and diodes 102 and 103 connected to it. FIG. 3 serves to indicate the matrix selection pattern which will be followed throughout a much larger panel according to well-known matrix design methods. If one of the charge storage diodes is selectively forward biased, it will have a low impedance in its reverse direction and will pass a high voltage pulse from a common write-erase pulse generator to the selected element on the display panel.

Charge storage diode 101 on electrode 100 may be selected and forward biased if a write erase selection circuit connected to terminal A 1 passes a current through diodes 104 and 102, through CSD 101 and through a second selection circuit terminal B 1. Immediately following the selective forward bias operation, CSD 101 will, because of its relatively long minority carrier lifetime, be capable of passing in its reverse direction the positive pulse output of the write-erase pulse circuitry. This write-erase pulse will pass through diode 105 and CSD 1 to the display electrode 100.

Sustain pulses are applied to all electrodes unselectively through fast recovery diodes 106, 107 and 108 connected to the sustain terminals S1 and S2. The matrix diodes 102, 109, 110 and 111 and a third set of diodes 103, 112, 113 and 114 attached to each electrode complete the circuit path for applying the sustain pulse to the display electrodes. The sustain circuitry drives the panel electrodes to a positive potential through output terminal S 1 and to ground or a negative potential through output terminal S 2.

The selection matrix shown in FIG. 3 is known in the prior art and it is a feature of the present invention to provide new and improved drive circuitry. It is also a feature to provide specific drive circuits which will allow implementation of the non-coincident selection method.

Figure 4:
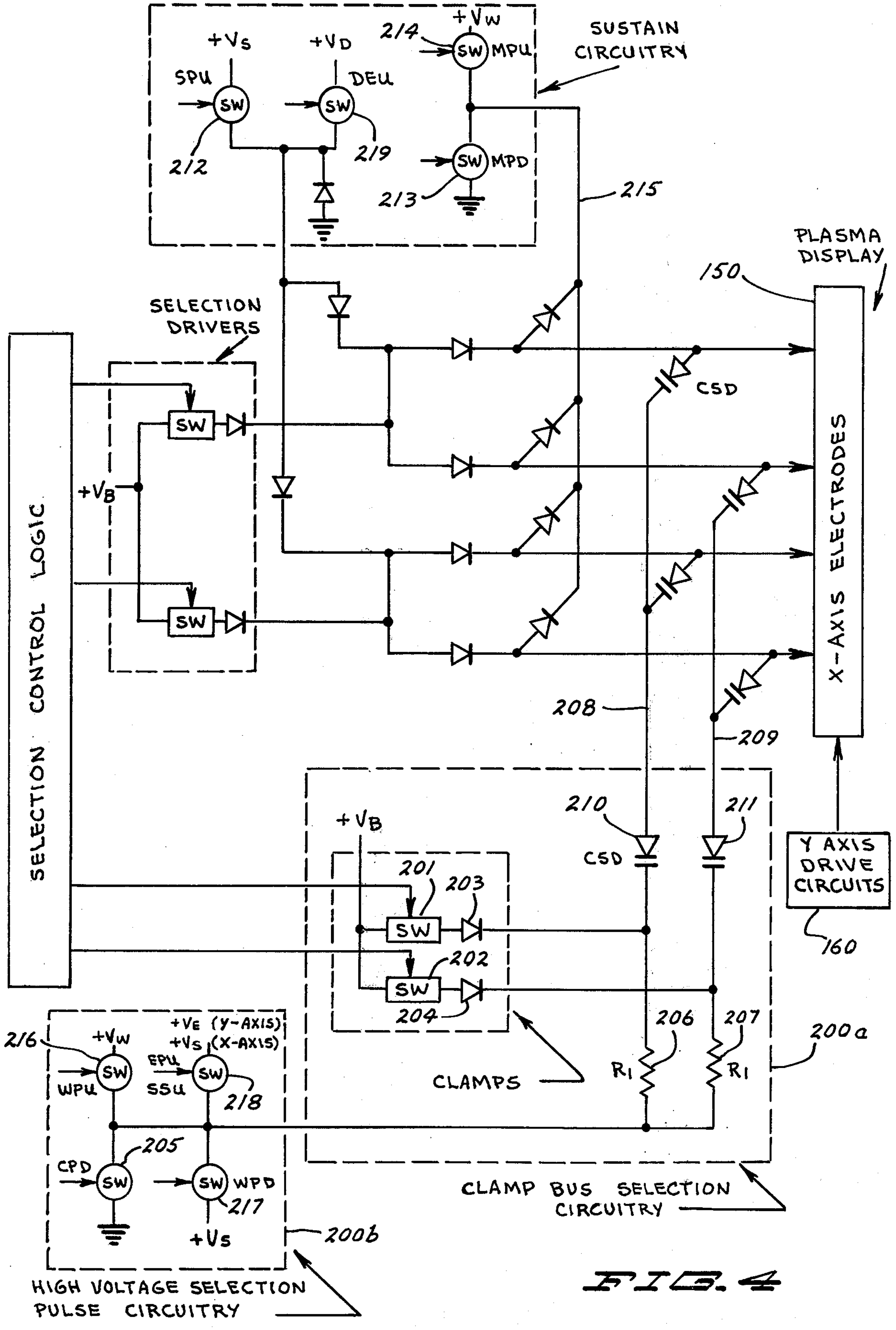

Referring now to FIG. 4, a schematic diagram of electronic drive circuitry according to the present invention is shown for the X axis for a display panel 150. The Y axis drive circuits 160 are identical to the X axis circuits shown. Low voltage switches, which may be transistors, are shown by a small rectangular box symbol. The arrow input to the box indicates an input from digital control circuits which may be of conventional design. When the low voltage switch is on, there is a low impedance path between the opposing terminals of the box.

The low voltage switches are used as drivers and clamps to control the forward biasing selection current of the charge storage diodes. In FIG. 4, two drivers and two clamps which can select up to four display electrodes are shown as representative of the matrix interconnection scheme which will allow fabrication of a large panel according to conventional matrix techniques. A practical display has many more electrodes and, for this, the number of driver switches and clamp switches as well as the selection matrix would expand. Each low voltage switch must withstand an open switch voltage of no greater than about 25 volts. A high voltage diode is connected in series with the output of each switch to block the high voltage pulses that pass through the selection matrix.

Ordinary fast recovery diodes have a reverse recovery time of approximately 0.01 - 0.05 microseconds where the ratio of forward current to reverse current is roughly 1:4. One example of a suitable type charge storage diode for the present application is a standard recovery diode of type IN647, or another having similar characteristics, specially selected to have a generally uniform reverse recovery time of approximately 0.1 - 0.5 microseconds where the ratio of forward current to reverse current is 1:4 and where the forward current used is in the range of 0.1 to 0.2 ampere. While these values and ranges are given as a relevant example, they are not meant to be limiting as to the scope of patent coverage.

The small circles shown in the schematic diagram represent low impedance high-voltage switches and are used in the sustain circuitry and the selection pulse circuitry. These switches may be transistors and may be controlled by the input, shown as an arrow, from conventional logic circuits. None of the high-voltage switches are involved in the selection of specific electrodes and therefore the number of different high voltage switch functions will not increase as rapidly as the size of the display as measured by the increasing number of display electrodes. This is of economic importance in that the cost of high voltage switches is generally greater than the cost of low voltage switches, particularly when the present state of the art involves the use of individual transistors as switches.

The clamp-bus selection circuitry 200 *a*, shown in a dashed line box, has been organized so that each clamp can use a low voltage switch with a protective diode. Thus, switches 201 and 202 are associated with diodes 203 and 204. The return current path involved in the selection of a CSD is handled by a single clamp pull-down high voltage switch 205. The forward bias selection current is controlled by separate current limiting resistors 206 and 207 labeled R 1 in the drawing, typically having a value of about 50 ohms, in series with each of the clamp buses 208 and 209. When a clamp switch is on, the associated clamp bus is inhibited or unselected and all of the associated CSDs are prevented from being selected. Selection of a CSD means that it is left in a condition which will allow the passage of a forward current. Charge storage diodes 210 and 211 have been added in series with the clamp buses 208 and 209 respectively for the purpose of blocking the high voltage selection pulse from being applied to the unselected clamp bus. This is an aid in preventing the unselected display electrode from being partially charged because of reverse leakage capacitance that may exist in unselected CSDs. The CSD in series with the selected clamp bus will be forward biased by the same current that selects the CSD on the selected electrode. They will therefore be conducting in the reverse direction so that the high voltage selection pulse can be applied to the selected electrode.

To further describe the drive circuitry in FIG. 4, an example will be given of how the sustain function, previously described in connection with FIG. 1, and the alternate write 1 function, previously described in connection with FIG. 2, is implemented. The high voltage selection pulse circuitry is shown in dashed time box 200 *b*. The X axis sustain pulse 50, of FIG. 1, is applied to the X axis electrodes by first turning on the sustain pullup driver (SPU) 212. Current from the sustain pullup driver 212 charges the display elements to Vs and returns to ground through a master pull-down driver that is identical in the Y axis circuit 160 to the X axis circuitry. The trailing edge of pulse 50 is created when the master pullup driver 214 is turned off and the master pull down driver 213 is turned on. The Y axis sustain pulse 51 is produced in a similar manner using the circuitry on the Y axis electrodes.

The alternate write 1 function is accomplished in the following manner: the charge storage diode selection circuitry is first used on the Y axis to select a CSD for the desired electrode. During the selection time the master pulldown driver (MOD) 213 is off and the master pullup driver (MPU) 214 is on. The master pullup driver 214 is used to help turn off the master pulldown driver 213 and to reverse bias the diodes on the master pulldown bus 215, thus removing a leakage path from the display electrodes. Following this selection, the Y axis clamp pulldown driver CPD is turned off and a write pullup driver (WPU) equivalent to write pull up driver 216 for the X axis is turned on. The write pulse is applied to the selected Y axis electrode through the selected CSDs. Shortly after the write pulse is applied the sustain pull up driver on the Y axis is turned on. This produces pulse 35 at all unselected electrodes on the Y axis. Pulse 34 is then partially terminated at trailing edge 36 by turning on the write pulldown driver (WPD) equivalent to WPD 217 for the X axis. The voltage on the selected electrode is thereby reduced to Vs. The pullup and pulldown drivers both produce voltage Vs, but since bipolar switches are not shown, the switch used to produce Vs depends on the previous voltage on the selected electrode.

At approximately the same time as the write pulldown driver is turned on for the Y axis drive electrode the selective sustain pullup driver (SSU) 218 on the X axis is turned on to generate pulse 52 which is applied through the previously selected CSD to the appropriate X axis electrode. After the 0 voltage gap time has been allowed, pulse 35 is terminated by turning on the master pulldown driver on the Y axis. At this same time, pulse 53 is created on all of the unselected X axis electrodes by turning on the dual-on-state erase pullup driver (DEU) 219. Pulses 52 and 53 are then terminated by turning on the X axis master pulldown driver 213. The other functions shown in FIGS. 1 and 2 can be implemented by similar control of the appropriate switches in the appropriate sequence as described hereinabove.

Figure 5:
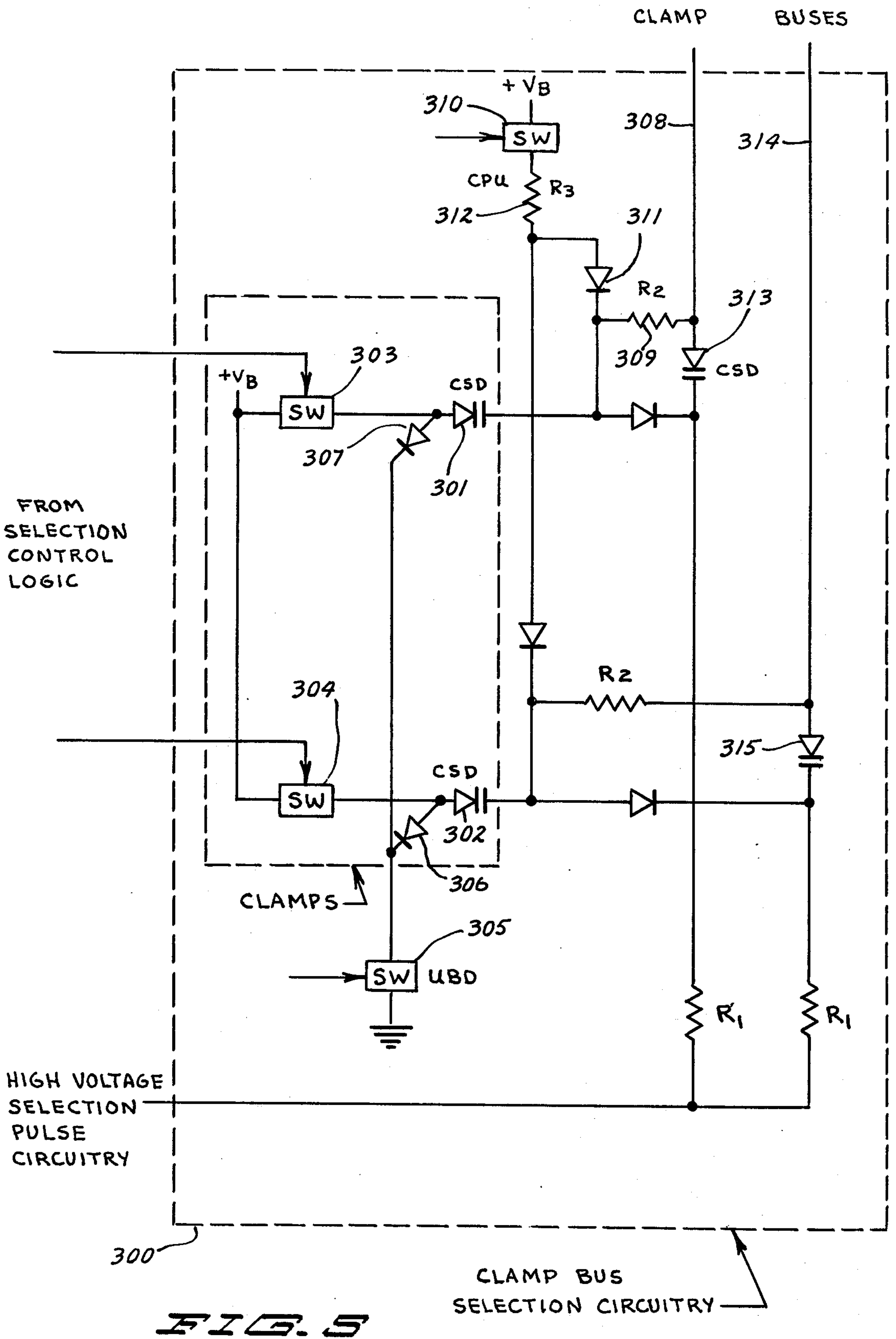

Referring now to FIG. 5, an improved version of the clamp bus selection circuitry 300 is shown involving the addition of charge storage diodes 301 and 302 in series with the output of the clamp switches 303 and 304, respectively, and an unselected bus pulldown switch (UBD) 305 attached to each clamp output through fast recovery diodes 306 and 307. The output of CSD 301 is connected to clamp bus 308 through resistor (R 2) 309 and to a clamp pullup switch (CPU) 310 through diode 311 and current limiting resistor (R 3) 312. The primary purpose of the new circuitry is to provide a low impedance path to ground for the unselected clamp bus. This serves to improve the ability of the charge storage diode 313 in series with the bus to eliminate partial selection pulses on unselected electrodes. The unselected clamp bus 308 has a low impedance path to ground by way of resistor 309, which has a value of about 50 ohms, and charge storage diode 301, diode 307 and the unselected bus pulldown switch 305 which is turned on when the selection pulse is applied. Charge storage diode 301 will conduct in its reverse direction because it was previously forward biased when unselected clamp switch 303 was turned on in the process of unselecting clamp bus 308. The selected clamp bus 314 will not have a low impedance to ground because charge storage diode 302 will not be forward biased since its clamp switch 304 is left off in order to allow bus 314 to be selected. As in the circuit of FIG. 4, charge storage diode 315 will be selected, that is forward biased, on the selected clamp bus 314 and the high voltage selection pulse will be applied to the selected electrode. The clamp pull up switch 310 is included to aid in turning off the selected charge storage diode 301. When the function is finished, clamp pull up switch 310 is turned on and a current will flow through current limiting resistor 312, diode 311, charge storage diode 301, diode 307, and unselected bus pull down switch 305 to ground. This current will continue to flow until charge storage diode 301 recovers and becomes reversed biased.

Figure 6:
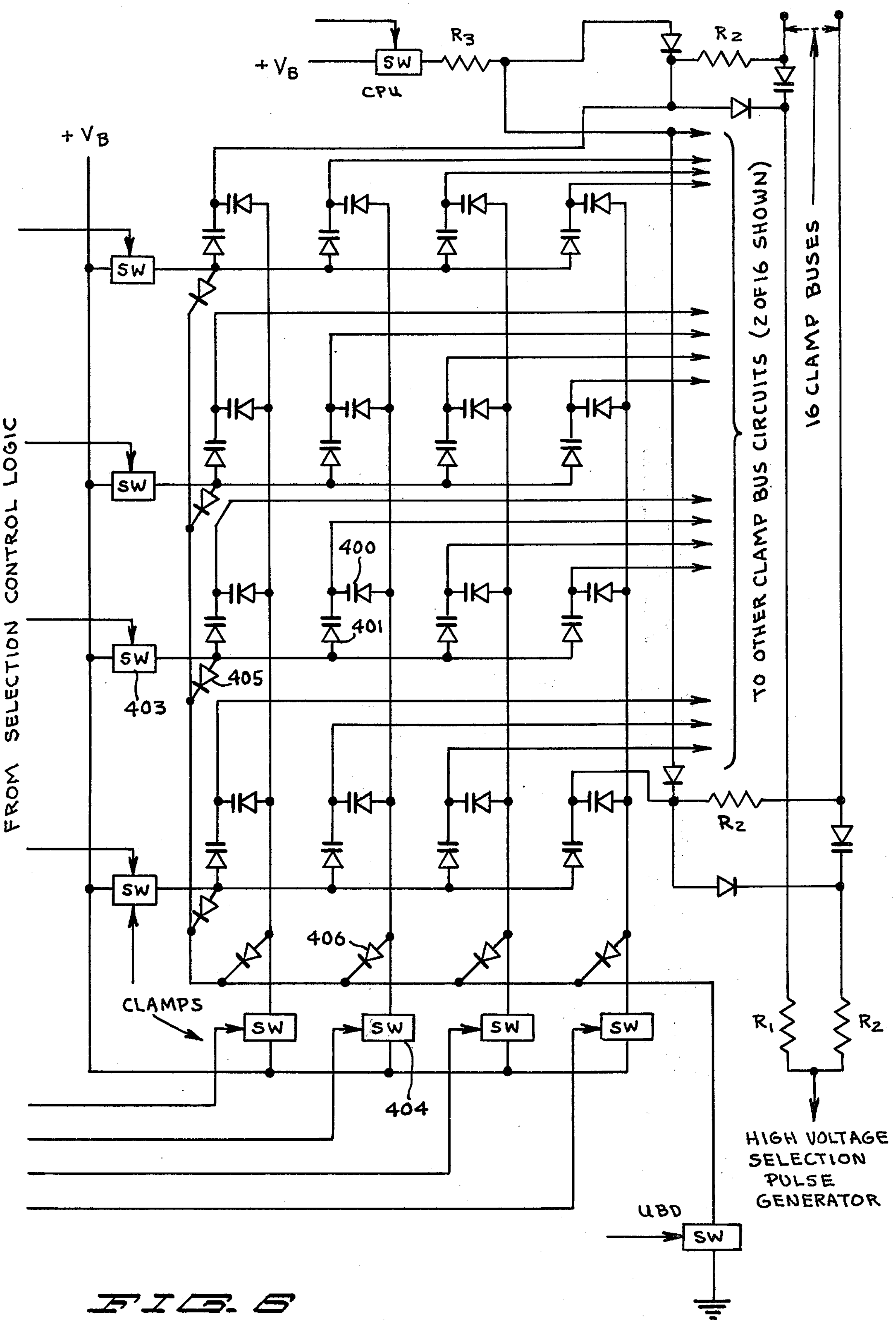

The clamp bus selection circuitry can be further improved as shown in FIG. 6. Selection for a large plasma display will have a charge storage diode selection matrix and a greater number of clamp busses will be needed. FIG. 6 shows a circuit and method of interconnecting the clamp bus circuitry with a 4 × 4 submatrix so that 8 clamps are allowed to control the selection of 16 clamp buses. The circuitry of FIG. 6 functions similarly to the circuitry of FIG. 5. The main difference is that two clamps, one from each axis of the submatrix, must be off to select the associated clamp buss. The remaining clamp switches are left on and this unselects the other clamp busses.

Taking an illustrative example from the matrix of FIG. 6, CSD's 400 and 401 operate similarly to CSD 302 shown in FIG. 5, except that both CSD's 400 and 401 must be unselected to provide an unclamped condition. Switches 403 and 404 together with diodes 405 and 406 perform the same function as switch 304 and diode 306 in FIG. 5.

What is claimed is:

1. Apparatus for driving a plasma display panel of a type having a plurality of drive electrodes comprising a first group and a second group of drive electrodes in generally orthogonal relationship to said first group in matrix arrangement and in which orthogonal pairs of said drive electrodes uniquely specify all display elements in the panel, said apparatus comprising:

selection control logic apparatus for producing selection signals for selectively addressing predetermined display elements, first sustain drive apparatus for said first group of drive electrodes comprising switches for selectively applying either a sustain amplitude voltage or a dual-on-state erase amplitude voltage to a first output and switches for selectively applying either a write amplitude voltage or a ground return voltage to a second output, second sustain drive apparatus for said second group of drive electrodes comprising switches for selectively applying either a sustain amplitude voltage or a dual-on-state erase amplitude voltage to a second output and switches for selectively applying either a write amplitude voltage or a ground return voltage to a second output, means including a fast recovery diode, for connecting each drive electrode of said first group to said second output of said first sustain drive apparatus, means including a fast recovery diode, for connecting each drive electrode of said second group to said second output of said second sustain drive apparatus, first means, including selection drivers and fast recovery diodes in matrix interconnection, for selectively connecting each drive electrode of said first group to said first output of said first sustain drive apparatus, second means, including selection drivers and fast recovery diodes in matrix interconnection, for selectively connecting each drive electrode of said second group to said first output of said second sustain drive apparatus, a plurality of charge storage diodes, at least one connected to each drive electrode of said first group and of said second group, a plurality of first clamp bus selection means for matrix interconnection to said charge storage diodes connected to the drive electrodes of said first group, each of said means being connected to at least two of said charge storage diodes, and wherein each of said clamp bus selection means comprises a charge storage diode and current limiting resistor connected in series with a low voltage clamp connected to the junction of said charge storage diode and resistor.

a plurality of second clamp bus selection means for matrix interconnection to said charge storage diodes connected to the drive electrodes of said second group; each of said means being connected to at least two of said charge storage diodes and wherein each of said clamp bus selection means comprises a charge storage diode and current limiting resistor connected in series with a low voltage clamp connected to the junction of said charge storage diode and resistor, a first high voltage selection pulse circuit means, connected to each of said current limiting resistors of said first clamp bus selection means, said selection pulse circuit means being selectively operable to have as an output a write amplitude voltage, a ground return voltage, or a sustain amplitude voltage, and a second high voltage selection pulse circuit means, connected to each of said current limiting resistors of said second clamp bus selection means, said selection pulse circuit means being selectively operable to have as an output a write amplitude voltage, a ground return voltage, selective erase amplitude voltage, or a sustain amplitude voltage.

2. The apparatus of claim 1 and further including a plurality of means for grounding unselected clamp buses comprising, in each of said clamp bus selection means:

an additional charge storage diode, a diode connected in series with said additional charge storage diode, said series combination being connected in series between said low voltage clamp and said junction of said charge storage diode and resistor, an unselected bus pulldown switch connected through a diode to said low voltage clamp, a clamp pullup switch, means for connecting said clamp pullup switch to the junction of said series combination of said additional charge storage diode and diode, and means for providing a low impedance path between the junction of said series combination of said additional charge storage diode and diode and the associated clamp bus.

3. The apparatus of claim 2 wherein said means for connecting comprises a series combination of a current limiting resistor and a diode.

4. The apparatus of claim 3 wherein said means for providing a low impedance path comprises a resistor.

5. The apparatus of claim 1 wherein each of said clamp bus selection means comprises a matrix selection means including at least two charge storage diodes, each associated with a low voltage clamp, and means for connecting said charge storage diodes to said junction of said charge storage diode and resistor.

6. In apparatus for driving a plasma display panel of a type having a plurality of drive electrodes comprising a first group and a second group of drive electrodes in generally orthogonal relationship to said first group in matrix arrangement and in which orthogonal pairs of said drive electrodes uniquely specify all display elements in the panel, and wherein said apparatus includes first means for selectively providing voltages in matrix interconnection to said first group of drive lines, second means for selectively providing voltages in matrix interconnections to said second group of drive lines, and a plurality of charge storage diodes, at least one connected to each drive electrode of said first group and of said second group, wherein the improvement comprises:

a plurality of first clamp bus selection means for matrix interconnection to said charge storage diodes connected to the drive electrodes of said first group, each of said means being connected to at least two of said charge storage diodes, and wherein each of said clamp bus selection means comprises a charge storage diode and current limiting resistor connected in series with a low voltage clamp connected to the junction of said charge storage diode and resistor, a plurality of second clamp bus selection means for matrix interconnection to said charge storage diodes connected to the drive electrodes of said second group, each of said means being connected to at least two of said charge storage diodes and wherein each of said clamp bus selection means comprises a charge storage diode and current limiting resistor connected in series with a low voltage clamp connected to the junction of said charge storage diode and resistor, a first high voltage selection pulse circuit means, connected to each of said current limiting resistors of said first clamp bus selection means, said selection pulse circuit means being selectively operable to have as an output a write amplitude voltage, a ground return voltage, or a sustain amplitude voltage, and a second high voltage selection pulse circuit means, connected to each of said current limiting resistors of said second clamp bus selection means, said selection pulse circuit means being selectively operable to have as an output a write amplitude voltage, a ground return voltage, selective erase amplitude voltage, or a sustain amplitude voltage.

7. The apparatus of claim 6 and further including a plurality of means for grounding unselected clamp buses comprising, in each of said clamp bus selection means:

an additional charge storage diode a diode connected in series with said additional charge storage diode said series combination being connected in series between said low voltage clamp and said junction of said charge storage diode and resistor, an unselected bus pulldown switch connected through a diode to said low voltage clamp, a clamp pullup switch, means for connecting said clamp pullup switch to the junction of said series combination of said additional charge storage diode and diode, and means for providing a low impedance path between the junction of said series combination of said additional charge storage diode and diode and the associate clamp bus.

8. The apparatus of claim 7 wherein said means for connecting comprises a series combination of a current limiting resistor and a diode.

9. The apparatus of claim 8 wherein said means for providing a low impedance path comprises a resistor.

10. The apparatus of claim 6 wherein each of said clamp bus selection means comprises a matrix selection means including at least two charge storage diodes, each associated with a low voltage clamp, and means for connecting said charge storage diodes to said junction of said charge storage diode and resistor.

11. The apparatus of claim 10 and further including a plurality of means for grounding unselected clamp buses comprising, in each of said clamp bus selection means:

an additional charge storage diode, a diode connected in series with said additional charge storage diode said series combination being connected in series between said low voltage clamp and said junction of said charge storage diode and resistor, an unselected bus pulldown switch connected through a diode to said low voltage clamp, a clamp pullup switch, means for connecting said clamp pullup switch to the junction of said series combination of said additional charge storage diode and diode, and means for providing a low impedance path between the junction of said series combination of said additional charge storage diode and diode and the associate clamp bus.

12. In apparatus for driving a plasma display panel of a type having a plurality of drive electrodes comprising a first group and a second group of drive electrodes in generally orthogonal relationship to said first group in matrix arrangement and in which orthogonal pairs of said drive electrodes uniquely specify all display elements in the panel, and wherein said apparatus is of the matrix selection type having at least two selection drive means associated with each group of drive electrodes and at least two clamp bus selection means associated with each group of drive electrodes, each clamp bus selection means being connected to at least two diodes, each diode being connected to a single drive electrode, the improvement comprising a clamp bus selection means including:

a charge storage diode, a current limiting resistor connected in a series with said charge storage diode, a low voltage clamp connected by connecting means to the junction of said charge storage diode and resistor, and high voltage selection pulse circuit means connected to said resistor.

13. The apparatus of claim 12 and further including means for grounding unselected clamp buses comprising:

an additional charge storage diode, a diode in series with said additional charge storage diode, means for connecting said additional charge storage diode to said low voltage clamp, means for connecting said diode to said junction of said charge storage diode and resistor, an unselected bus pulldown switch, means for connecting said unselected bus pulldown switch to said low voltage clamp, a clamp pullup switch, means for connecting said clamp pullup switch to the junction of said additional charge storage diode and diode, and means for providing a low impedance path to ground from said clamp bus to the junction of said additional charge storage diode and diode.

* * * * *